Aug. 12, 1930. H. H. HALL 1,772,716
AUTOMATIC PARKING DEVICE FOR AUTOMOBILES
Filed April 19, 1929 2 Sheets-Sheet 1
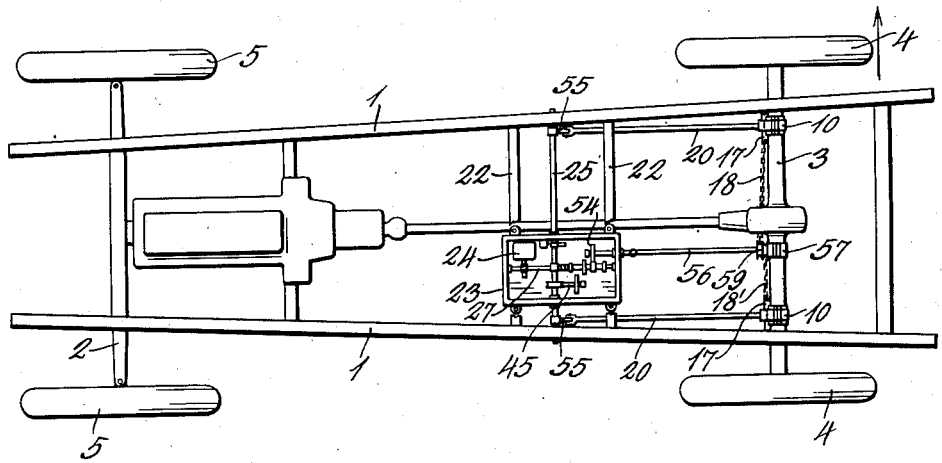
Fig.1.
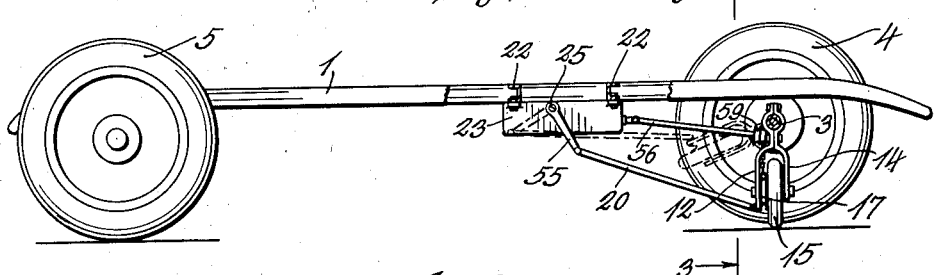
Fig.2.
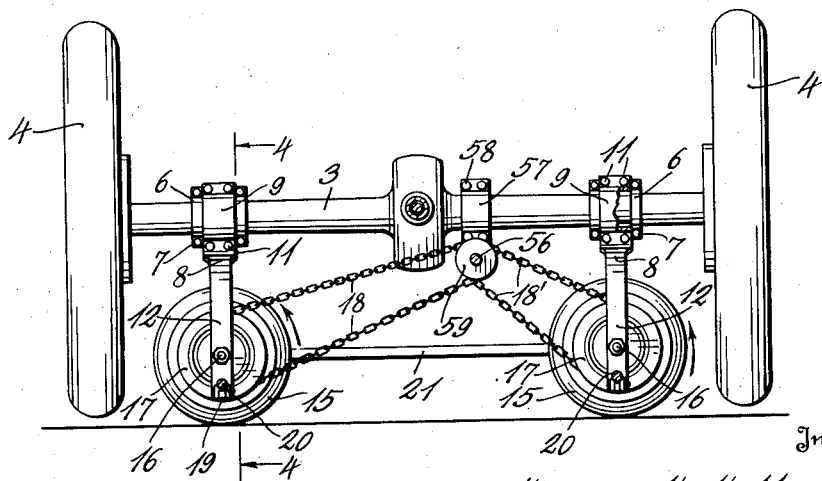
Fig.3.
Inventor
Harvey H. Hall.
By 
Attorney Aug. 12, 1930.  H. H. HALL  1,772,716
AUTOMATIC PARKING DEVICE FOR AUTOMOBILES
Filed April 19, 1929  2 Sheets-Sheet 2

Inventor
Harvey H. Hall.
By

Patented Aug. 12, 1930

1,772,716

UNITED STATES PATENT OFFICE

HARVEY H. HALL, OF ARVADA, COLORADO

AUTOMATIC PARKING DEVICE FOR AUTOMOBILES

Application filed April 19, 1929. Serial No. 356,329.

This invention relates to improvements in parking devices for automobiles, and has reference more particularly to the improvement in that type of parking device shown and described in my copending application, Serial No. 261,016, filed March 12, 1928.

It is the object of this invention to produce a simple and efficient parking device that can be quickly attached to any automobile and which can be operated from the starting battery.

It is the further object of this invention to produce a parking device that will occupy very little space and which will be practically automatic in its operation requiring only the movement of a switch to control it.

The above and other objects which will become apparent as the description proceeds are attained by means of a construction and arrangement of parts which will now be described in detail, and reference for this purpose will be had to the accompanying drawings in which the preferred embodiment thereof has been illustrated, and in which:

Fig. 1 is a top plan view of an automobile chassis showing the parking device in place thereon, parts of the chassis being broken away to better disclose the construction;

Fig. 2 is a side elevation of the chassis shown in Fig. 1 with part of the chassis frame and a part of the rear axle removed so as to better disclose the construction;

Fig. 3 is a section taken on line 3—3, Fig. 2;

Figures 4, 5:
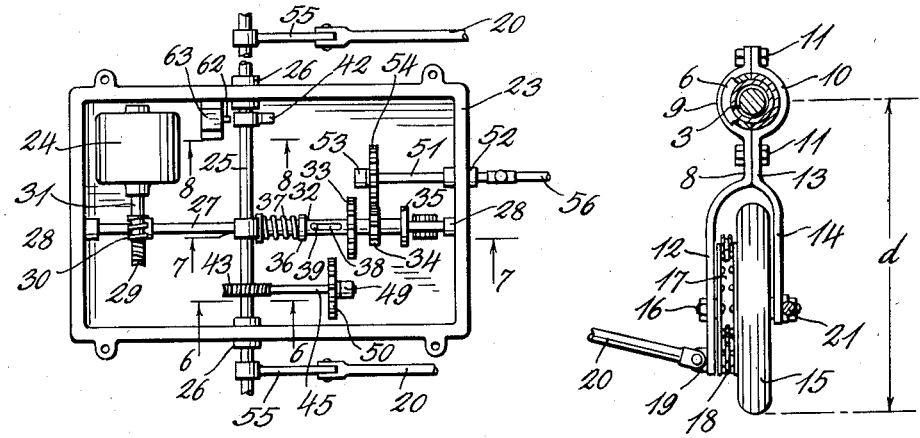
Fig. 4 is a section taken on line 4—4, Fig. 3.
Fig. 5 is a top plan view of the casing, the motor and the gear shift mechanism.

In the drawings numeral 1 represents the side frame members of an automobile chassis, numeral 2 the front axle and numeral 3 the rear axle housing. Two drive wheels 4 are secured to the rear axle housing in the usual manner and the front axle is provided with wheels 5. This invention does not pertain to the automobile construction and therefore the chassis has been shown more or less diagrammatically for the purpose of showing the relation of the several parts of my invention to the automobile chassis frame and to the rear axle housing. Secured to the rear axle housing are two split bearings 6 which are clamped to the outside of the housing by means of bolts 7 in the manner shown in Figs. 3 and 4. Secured to the bearings 6 are arms 8. These arms are provided at their upper ends with a semi-circular portion 9 which cooperates with a complementary semi-circular portion 10, so as to embrace the bearing 6. Portions 9 and 10 are held together by means of bolts 11 and part 8 has its lower portion bent outwardly from the plane of the central part 8 and this part extends downwardly in the manner indicated at 12. Part 10 has a straight portion 13 whose lower end extends downwardly as indicated at 14, wheel 15 is located between the two parts 12 and 14 and is pivoted so that it may rotate about the axle 16. Each of wheels 12 are provided with a sprocket wheel 17 with which the drive chains 18 cooperate. The lower end of part 12 is provided with an ear 19 to which is pivotally connected one end of the connecting rod 20. A brace bar 21 extends from one of the arms to the other in the manner shown in Fig. 3. The arms are so attached to the bearings that they may be rotated about the axis of the latter from the full line position shown in Fig. 2, to the dotted line position and in the reverse order. The dotted line position shown in Fig. 2 will be referred to as in the inoperative position, while the full line position will be referred to as the operative position. The distance from the center of the axle housing to the lower periphery of wheels 15, which distance has been indicated in Fig. 4 by means of $d$ is somewhat greater than the radius of the wheels 4 so that when the arms are in operative position, the wheels 4 will be raised above the supporting surface so that the entire weight of the parts supported by their rear axle will be supported by wheels 15. It is evident that when the parts are in the position shown in Figs. 2 and 3, that the rear end of the automobile can be moved in a transverse direction by rotating wheels 15.

Figures 6, 7:
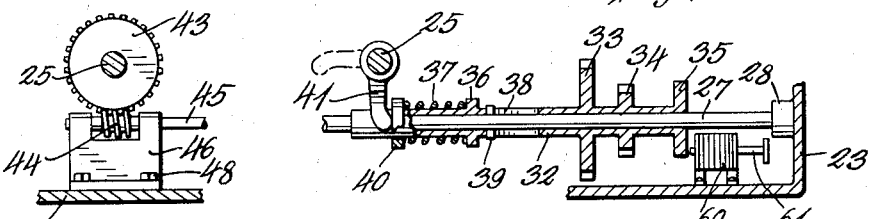
Fig. 6 is a section taken on line 6—6, Fig. 5.
Fig. 7 is a section taken on line 7—7, Fig. 5.
Figure 8:
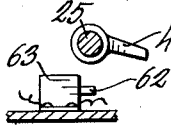
Fig. 8 is a section taken on line 8—8, Fig. 5.

The means for rotating wheels 15 and for rotating the arms about the axis of the rear axle housing will now be described. Secured to the transverse members 22 of the chassis frame is a casing 23 within which is located a motor 24. A shaft 25 extends transversely through the casing and is journaled in bearings 26 in the opposite sides of the casing. The outer ends of this shaft are also journalled in suitable bearings secured to the under side of frame members 1. A shaft 27 extends longitudinally of the casing at right angles to the shaft 25. Shaft 27 is journalled in bearings 28 and is provided with a worm wheel 29 that cooperates with a worm 30 carried by the motor shaft. It is therefore apparent that when the motor 24 operates, it will rotate shaft 27 but at a much slower rate than the rate at which shaft 31 is rotating. Rotatably mounted on shaft 27 is a tubular sleeve 32 which has formed integral therewith two gear wheels 33 and 34 and is also provided with a circular disk 35. Sleeve 32 is also provided with an outwardly extending flange 36, which serves as an abutment for one end of a spring 37 and has a diametrically located elongated opening 38 which is adapted to receive the pin 39 that extends through shaft 27. A collar 40 is slidable on the sleeve 32 and serves as an abutment for the other end of spring 37. Secured to shaft 25 so as to rotate therewith is a forked arm 41, whose end engages the collar 40 in the manner shown in Fig. 7. An arm 42 is also secured to shaft so as to rotate therewith and the function of this arm will appear as the description proceeds. Secured to shaft 25 is a worm wheel 43 that cooperates with the worm 44 on the end of shaft 45. This shaft is journalled in a bearing 46 secured to the bottom 47 of the casing by means of screws 48 in the manner shown in Fig. 6. The other end of shaft 45 is journalled in the bearing 49 and carries a gear wheel 50. A shaft 51 has one end journalled in a bearing 52 in one end of casing 23 and the other end of this shaft is journalled in the bearing 53. Shaft 51 carries a gear wheel 54. When the sleeve 32 is in the position shown in Figs. 5 and 7 gear 34 will be in mesh with gear 54, but if this sleeve is moved in the opposite direction until the pin 39 is at the other end of slot 38, the gear wheel 33 will be in mesh with gear 50. Secured to shaft 25 are two arms 55 to the outer ends of which are pivotally connected the connecting rods 20. The other ends of these connecting rods as above explained are connected to the ears 19 on the pivoted arms. When shaft 25 is rotated so as to bring arms 55 into the dotted line position shown in Fig. 2, the arms carrying wheels 15 will be brought into inoperative position and when shaft 25 is rotated in the opposite direction so as to bring arms 55 to the full line position shown in Fig. 2, wheels 15 will be brought into operative position in which position, as above explained, the weight of the rear end of the car will be supported by wheels 15. When arms 55 are in the dotted line position shown in Fig. 2 the forked arm 41 shown in Fig. 7 will also be in the dotted line position and therefore spring 37 will not exert any force against the flange 36. When the parts are in this position, sleeve 32 can be readily moved so that pin 39 will engage the other end of slot 38 and this is the position maintained by sleeve 32 when the parts are in inoperative position. In inoperative position therefore, gear wheel 33 meshes with gear 50 and gear 34 is disconnected from gear 54. If we now rotate motor 34 so as to rotate shaft 25 in a counter-clockwise direction (Fig. 2) the latter will continue to rotate until the forked arm 41 engages the ring 40 and compresses spring 37 sufficiently to move sleeve 32 rearwardly on shaft 27 to such an extent that gear 33 will be disconnected from gear 50 and gear 34 connected to gear 54. Shaft 25 will now cease rotating and will be held against accidental rotation by the locking action of worm 44 and worm gear 43. The parts are so adjusted that this shifting of the gears takes place only after the wheels 15 have been moved to the operative position. The rotation of shaft 51 is transmitted to shaft 56 through universal joint 57. The rear end of shaft 56 is journalled in a bearing 57 secured to the axle housing by means of clamps that are held in place by bolts 58. Two sprocket wheels 59 are secured to the rear end of shaft 56 directly in front of bearing 57 and chains 18 and 18' connect each of the sprocket wheels 59 with one of the sprocket wheels 17 on wheels 15. It will now be apparent that when shaft 56 is rotated, wheels 15 will be rotated and this, in turn, will move the rear end of the car in a transverse direction. The parts are so adjusted that when the gears are shifted as above described, shaft 56 will rotate so as to cause wheels 15 to rotate in the direction of the arrows shown in Fig. 3 and this will move the rear end of the car in the direction of the arrow shown in Fig. 1 or towards the curb on the right hand side of the car. When the car has been moved transversely to the extent desired, the motor is stopped by opening the control switch which will be refererd to hereinafter and the parts will then come to a stop. As the rear end of the automobile is supported by wheels 15 it can only move transversely and therefore the car will be prevented from moving longitudinally and will be practically locked in this position until the parking device has been brought back to inoperative position. When it is desired to bring the parking device back to inoperative position, the motor is started to rotate in the opposite direction, whereby wheels 15 will be rotated so as to move the rear end of the car in the opposite direction. When the rear end of the car has been moved away from the curb to the extent necessary, the switch connections are altered so as to energize the electromagnet 60. This will move the core 61 against the surface of disk 35 with sufficient force to compress spring 37 and move gear wheel 33 into operative position with respect to gear 50 and at the same time disconnect gear 34 from gear 54. Shaft 25 will now be rotated in such a direction that arms 55 will move towards dotted line position, thereby rotating the arms carrying wheels 15 into inoperative position and when the parts have reached inoperative position, arm 42 will engage a movable part 62 so as to open switch 63 that is in the main battery circuit, thereby bringing the parts to a stop.

Figure 9:
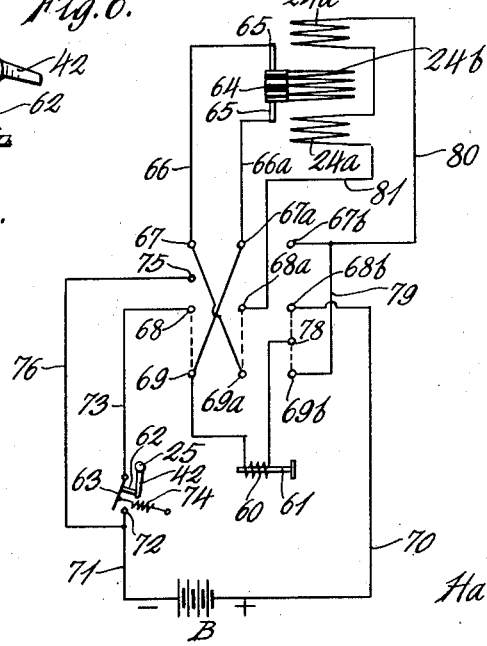
Fig. 9 is a wiring diagram.

In Fig. 9 I have shown a diagram of the circuit connections. In this diagram B represents the starting battery which is part of the ordinary automobile equipment, and 24ª and 24ᵇ are respectively the field coils and the armature winding of motor 24 which in the present installation is a series wound motor. Numeral 64 represents the commutator to which the brushes 65 are connected in the usual manner. Conductors 66 and 66ª extend from the brushes 65 to contacts 67 and 67ª of a reversing switch. The reversing switch shown is a three-pole double throw switch. The center contacts to which the knife blades are pivotally attached have been designated by reference characters 68, 68ª and 68ᵇ. One set of contacts have been designated by reference characters 69, 69ª and 69ᵇ, while the other set has been designated by characters 67, 67ª and 67ᵇ. A conductor 70 leads from one pole of the battery B to switch terminal 68ᵇ and conductor 71 extends from the other pole of the battery to the switch contact 72 which forms part of switch 63. From the other member of switch 63, a conductor 73 extends to switch contact 68. A spring 74 tends to move the switch 63 to closed position and this switch is therefore only open when arm 42 engages the part 62 and moves the switch contact against the action of the spring. The reversing switch is provided with an auxiliary contact 75 that is located between contacts 67 and 68 so as to be electrically connected with the other two contacts when the knife blades extend between contacts 68 and 67. A conductor 76 extends from conductor 71 to contact 75, so that when the switch blade connects contacts 67 and 68 switch 63 will be short circuited. An electromagnet 60 is connected between contact 69 and the auxiliary contact 78 which is located between contacts 68ᵇ and 69ᵇ. Contact 78 is shorter than contact 69ᵇ so that the switch blade which has been shown dotted can make connection between contact 68ᵇ and 69ᵇ without coming in contact with 78, but the switch blades can also be moved downwardly so as to come in contact with 78. Contacts 67ᵇ and 69ᵇ are connected by a conductor 79 and from this conductor a conductor 80 extends to one terminal of the field coils, while the other terminal of the field is connected by means of a conductor 81 to contact 68ª. With the parts connected in the manner shown in Fig. 9, let us assume that the switch blades are thrown upwardly so as to connect contacts 68 with contacts 67. Current will now flow through conductor 70 to contact 68ᵇ and thence through the switch blade to contact 67ᵇ from which the current will flow through conductor 80 to the field coils and back to contact 68ª. From 68 the current will flow through the switch blade to contact 67ª and thence through conductor 68ª to one of the brushes 65 and thence through the armature to the other brush, returning to the switch contact 67 through conductor 66 and from contact 67 the current will flow through the switch blade to contact 65 and thence through conductors 76 and 71 back to the battery. The motor will now rotate in such a direction that the parking device will be moved to operative position. As soon as shaft 25 has started to rotate, switch 63 will close and remain closed until it is again opened by a reverse rotation of this shaft. When the parking device has been brought to operative position and the automobile moved to the desired parking position, the switch is open. To reverse the operation of the parking device the switch blades are moved downwardly into dotted line position. In this position the current will flow in the same direction through the field coils, but will be reversed in the armature thereby reversing the direction of the rotation of the motor. When the car has been brought away from the curb the desired distance, the switch blades are depressed until contact is made with switch contact 78, thereby energizing the magnet 60 which shifts the gears in the manner above described. The operation will then continue until the arms carrying the wheels have reached dotted line position, when arm 42 will engage member 62 and open the switch, thereby cutting off the supply of current and bringing the parts to a standstill. The device as seen from the above description can be operated in either direction by means of a triple pole double throw switch illustrated or by some equivalent means.

From the above it will be apparent that I have produced a parking device that is adapted to be attached to an automobile of usual construction and which is so designed that it will be very compact and will be automatic in its operation requiring the operator merely to open and close the electric control switch in the manner described.

Having described my invention what is claimed as new is:

1. In combination with a vehicle having an elongated chassis frame, an axle extending transversely near one end thereof, wheels secured to the ends of the axle, a pair of spaced arms pivotally secured to the axle, a parking wheel rotatably secured to each arm, means for simultaneously rotating the arms about their pivots so as to move them from operative to inoperative position, means for automatically rendering the rotating means inoperative when the wheels have been moved to operative or to inoperative position and means for positively holding the arms against accidental rotation when in either operative or inoperative position.

2. In combination with an automobile chassis having a transverse axle and two spaced interconnected arms pivotally secured to the axle, a wheel rotatably connected to each arm, means for simultaneously rotating the arms from inoperative to operative position, means for simultaneously rotating the wheels in the same direction and means for simultaneously disconnecting the arm rotating means when the latter have reached operative position and simultaneously rendering the wheel rotating means operative.

3. In combination with an automobile chassis having a transverse axle and two spaced interconnected arms pivotally secured to the axle, a wheel rotatably connected to each arm, means for simultaneously rotating the arms from inoperative to operative position, means for simultaneously rotating the wheels in the same direction, means for simultaneously disconnecting the arm rotating means when the latter have reached operative position and simultaneously rendering the wheel rotating means operative and means for positively holding the arms against rotation both in operative and inoperative position.

In testimony whereof I affix my signature.

HARVEY H. HALL.